United States Patent
Whitney et al.

(10) Patent No.: US 8,417,264 B1
(45) Date of Patent: Apr. 9, 2013

(54) METHOD AND APPARATUS FOR DETERMINING LOCATION OF A MOBILE STATION BASED ON LOCATIONS OF MULTIPLE NEARBY MOBILE STATIONS

(75) Inventors: Jason K. Whitney, Lee's Summit, MO (US); Jason R. Delker, Olathe, KS (US); John M. Everson, Leawood, KS (US); Michael T. Lundy, Olathe, KS (US)

(73) Assignee: Spring Spectrum L.P., Overland Park, KS (US)

( * ) Notice: Subject to any disclaimer, the term of this patent is extended or adjusted under 35 U.S.C. 154(b) by 387 days.

(21) Appl. No.: 12/465,846

(22) Filed: May 14, 2009

(51) Int. Cl.
*H04W 24/00* (2009.01)

(52) U.S. Cl.
USPC .................. 455/456.6; 455/456.1; 455/456.2

(58) Field of Classification Search ................ 455/456.6
See application file for complete search history.

(56) References Cited

U.S. PATENT DOCUMENTS

| | | | |
|---|---|---|---|
| 3,710,335 A | 1/1973 | Lepley | |
| 5,528,247 A | 6/1996 | Nonami | |
| 5,736,962 A | 4/1998 | Tendler | |
| 5,974,312 A | 10/1999 | Hayes, Jr. et al. | |
| 5,990,826 A | 11/1999 | Mitchell | |
| 6,141,542 A | 10/2000 | Kotzin et al. | |
| 6,233,448 B1 | 5/2001 | Alperovich et al. | |
| 6,246,376 B1 | 6/2001 | Bork et al. | |
| 6,295,449 B1 | 9/2001 | Westerlage et al. | |
| 6,456,852 B2 | 9/2002 | Bar et al. | |
| 6,473,038 B2 | 10/2002 | Patwari et al. | |
| 6,560,462 B1 | 5/2003 | Ravi et al. | |
| 6,608,592 B2 | 8/2003 | McReynolds | |
| 6,657,549 B1 | 12/2003 | Avery | |
| 6,748,226 B1 | 6/2004 | Wortham | |
| 6,898,434 B2 | 5/2005 | Pradhan et al. | |
| 6,963,749 B2 | 11/2005 | Hayashida | |
| 6,985,812 B2 | 1/2006 | Sweetapple | |
| 6,993,345 B2 | 1/2006 | Ogino et al. | |
| 7,027,808 B2 | 4/2006 | Wesby | |
| 7,117,015 B2 | 10/2006 | Scheinert et al. | |
| 7,181,207 B1 | 2/2007 | Chow et al. | |
| 7,221,928 B2 | 5/2007 | Laird et al. | |
| 7,227,710 B2 | 6/2007 | Blaum et al. | |
| 7,257,426 B1 | 8/2007 | Witkowski et al. | |
| 7,272,121 B2 | 9/2007 | Wilkes et al. | |
| 7,283,091 B1 | 10/2007 | Loomis | |
| 7,313,401 B2 | 12/2007 | Karmel | |

(Continued)

OTHER PUBLICATIONS

U.S. Appl. No. 10/457,603, filed Jun. 9, 2003.

(Continued)

*Primary Examiner* — Charles Appiah
*Assistant Examiner* — Mazda Sabouri (57) ABSTRACT

Disclosed is a method and apparatus for determining the location of a mobile station based on the locations of a group of nearby mobile stations. A mobile station implementing the method will engage in short-range wireless communication with nearby mobile stations to determine the location of the nearby mobile stations and the distances between it and each nearby mobile station. The mobile station will then apply triangulation or another algorithm to compute its own location based on the determined locations and distances of the nearby mobile stations. Further, a serving radio access network can assist by providing a trust-signal to the nearby mobile stations, with the nearby mobile stations then reporting their locations conditional upon their receipt of both the location query and the trust-signal.

20 Claims, 7 Drawing Sheets

U.S. PATENT DOCUMENTS

| | | | |
|---|---|---|---|
| 7,577,443 | B1 | 8/2009 | Moll et al. |
| 7,595,752 | B2 | 9/2009 | van Diggelen et al. |
| 7,603,128 | B1 | 10/2009 | Jones et al. |
| 7,668,765 | B2 | 2/2010 | Tanaka et al. |
| 7,831,216 | B1 | 11/2010 | Yenney et al. |
| 2001/0014597 | A1 | 8/2001 | Takiguchi et al. |
| 2001/0048746 | A1 | 12/2001 | Dooley |
| 2002/0118723 | A1* | 8/2002 | McCrady et al. ............. 375/130 |
| 2002/0164995 | A1 | 11/2002 | Brown et al. |
| 2002/0177476 | A1 | 11/2002 | Chou |
| 2003/0018744 | A1 | 1/2003 | Johanson et al. |
| 2004/0204097 | A1 | 10/2004 | Scheinert et al. |
| 2005/0152396 | A1* | 7/2005 | Pichna et al. ................. 370/467 |
| 2006/0072537 | A1 | 4/2006 | Lee et al. |
| 2006/0087999 | A1* | 4/2006 | Gustave et al. ............... 370/328 |
| 2006/0291427 | A1 | 12/2006 | Park |
| 2007/0135140 | A1 | 6/2007 | Tervo |
| 2008/0085727 | A1* | 4/2008 | Kratz .......................... 455/456.5 |
| 2008/0119160 | A1 | 5/2008 | Andriantsiferana et al. |
| 2008/0132245 | A1* | 6/2008 | Snow et al. ................. 455/456.1 |
| 2008/0244148 | A1 | 10/2008 | Nix, Jr. et al. |
| 2008/0299992 | A1 | 12/2008 | Eitan et al. |
| 2008/0318626 | A1* | 12/2008 | Rofougaran ............... 455/556.1 |
| 2009/0011779 | A1 | 1/2009 | MacNaughtan et al. |

OTHER PUBLICATIONS

Office Action from U.S. Appl. No. 10/457,603, dated Mar. 23, 2006.
Office Action from U.S. Appl. No. 10/457,603, dated Sep. 8, 2006.
Office Action from U.S. Appl. No. 10/457,603, dated Jan. 29, 2007.
Office Action from U.S. Appl. No. 10/457,603, dated Aug. 1, 2007.
Office Action from U.S. Appl. No. 10/457,603, dated Mar. 18, 2008.
Office Action from U.S. Appl. No. 10/457,603, dated Sep. 30, 2008.
Office Action from U.S. Appl. No. 10/457,603, dated Feb. 17, 2009.
G. Djuknic and R. Richton, "Geolocation and Assisted-GPS," Lucent White Paper, 2000.
M. Amundson, "Dead Reckoning for consumer Electronics," 2006 Honeywell International.
Office action from U.S. Appl. No. 11/945,964, dated Dec. 24, 2009.
Notice of allowance from U.S. Appl. No. 11/945,964, dated Jul. 7, 2010.
Office action from U.S. Appl. No. 11/960,987, dated Dec. 11, 2008.
Notice of allowance from U.S. Appl. No. 11/960,987, dated May 14, 2009.
U.S. Appl. No. 11/954,072, filed Dec. 11, 2007.
Office action from U.S. Appl. No. 11/954,072, dated Oct. 14, 2009.
Office action from U.S. Appl. No. 11/954,072, dated Apr. 2, 2010.
Office action from U.S. Appl. No. 11/954,072, dated Jun. 15, 2010.
Office action from U.S. Appl. No. 11/954,072, dated Feb. 25, 2011.
Office action from U.S. Appl. No. 11/954,072, dated Aug. 8, 2011.

* cited by examiner

METHOD AND APPARATUS FOR DETERMINING LOCATION OF A MOBILE STATION BASED ON LOCATIONS OF MULTIPLE NEARBY MOBILE STATIONS

BACKGROUND

In a typical cellular wireless communication system, it is often desirable to determine the location of a mobile station such as a cellular telephone. The location of a user's mobile station can facilitate various services, such as emergency response and commercial information services (e.g., navigation or reporting of nearby points of interest), among others.

One increasingly common way to determine the location of a mobile station to analyze signals that the mobile station receives from Global Positioning System (GPS) satellites. In practice, when it becomes necessary to determine the location of the mobile station, the mobile station may employ a GPS receiver to receive signals from GPS satellites in the sky over the mobile station. The mobile station, or a network server to which the mobile station reports, may then analyze information about those signals in order to compute with a fairly high level of accuracy the location of the mobile station. This computed location may then be passed along to a location based service provider, such as an emergency service center or a commercial information service center, or may be used by the mobile station itself or in various other ways, to provide useful location-based information or functionality.

One problem with using GPS signals to determine mobile station location is that a mobile station may not always have a clear enough view of the sky to receive the necessary GPS signals. For instance, when a mobile station is inside a house or other building, the structure of the building may prevent the GPS signals from reaching the mobile station's receiver. In situations like that, other more rudimentary forms of location determination may then be used. However, further improvement is still desirable.

OVERVIEW

When a mobile station cannot determine its location by itself, the mobile station may engage in short-range wireless communication with a nearby mobile station to learn the nearby mobile station's location, and the mobile station may then use that location as a representation of its own location. Unfortunately, however, merely obtaining a location report from a nearby mobile station is fairly inaccurate, as it begs the question of where that nearby mobile station is in relation to the mobile station whose location is at issue.

One further enhancement would be to have the mobile station receive not only the location of a nearby mobile station but also an indication of how far away that mobile station is. For instance, if the mobile station can determine a signal delay for its communication with the nearby mobile station, the mobile station can translate that signal delay into a corresponding distance to the nearby mobile station. Still, however, this would leave open the question of where the mobile station is (e.g., in what direction) at that distance from the nearby mobile station.

Disclosed herein is a method and associated apparatus for determining the location of a mobile station based on the locations of multiple nearby mobile stations. As presently contemplated, a mobile station implementing the method will engage in short-range wireless communication with nearby mobile stations to determine the location of the nearby mobile stations and the distances between it and each nearby mobile station, and the mobile station will then apply triangulation or another algorithm to compute its own location based on the determined locations and distances of the nearby mobile stations.

By way of example, the mobile station may wirelessly broadcast a query signal seeking to have any nearby mobile stations respond with indications of their locations, and the mobile station may then receive responses from at least three nearby mobile stations. The responses may carry details of the locations of nearby mobile stations. Further, the responses may carry timestamps or other information that allow the mobile station to determine delay, and in turn distance, for each nearby mobile station. The mobile station may then apply triangulation to determine its own location based on the locations and distances of the nearby mobile stations. In particular, given each nearby mobile station location and distance, the mobile station may compute an arc or circle centered about the nearby mobile station location and having a radius equal to the distance. The mobile station may then compute a point or area of intersection of those arcs or circles, which would approximate where the mobile station itself is located. Thus, the mobile station may programmatically conclude that the point or area of intersection is its location.

It is known to use triangulation to determine the location of a mobile station based on the locations of multiple serving base stations at fixed locations. However, in the usual case, the multiple serving base stations will not be very near the mobile station whose location is at issue. Thus, the accuracy resulting from triangulation based on cellular base station locations and distances tends to be relatively low.

Advantageously, the present method involves a mobile station applying triangulation with respect to nearby mobile stations, and particularly with respect to nearby end-user devices (such as cellular telephones), which may be far closer to the mobile station whose location is at issue. For instance, in an urban area where many users of cellular telephones are outdoors and have a plain view of the sky, a cellular telephone carried by a user inside a building could benefit from triangulating its own location based on GPS-determined locations of cellular telephones that are currently just outside the building.

One potential problem with this method, however, is that nearby mobile stations may not have good reason to trust the querying mobile station and may thus not report their locations to the querying mobile station. Furthermore, the nearby mobile stations may have no reason to be scanning the airwaves in search of such a location query in the first place, particularly as doing so may drain battery power. A further enhancement aimed at overcoming this problem is also disclosed herein.

According to this further enhancement, the mobile station that seeks to determine its own location based on locations of nearby mobile stations would not only broadcast a query signal that seeks locations of nearby mobile stations but would also send to its serving radio access network (RAN) a request for the RAN to provide a trust-signal to the nearby mobile stations. In response to the request for a trust-signal, the RAN would then provide a trust-signal to the nearby mobile stations (for instance, by broadcasting the trust-signal for receipt by all mobile stations within the same wireless coverage area as the requesting mobile station). Each nearby mobile station may then report its location to the querying mobile station only if it receives both (i) the query from the mobile station and (ii) the trust-signal from the RAN.

The theory here is that the RAN would not provide the trust-signal unless the RAN has an appropriate relationship (e.g., service subscription relationship) with the requesting mobile station. So the nearby mobile stations may rely on the trust-signal as an indication that the RAN backs the exchange of location information. Further, the trust-signal from the RAN can advantageously function as a trigger to cause each nearby mobile station to begin scanning the airwaves in search of a location query from the mobile station whose location is at issue.

Preferably with this further enhancement, both the querying mobile station and each nearby mobile station would subscribe to service from the same wireless carrier, as that wireless carrier would likely be the entity that receives the request for trust-signal from the querying mobile station and responsively provides the trust-signal to the nearby mobile stations. In this enhanced process, the communications with the RAN may occur through a cellular wide area network protocol (i.e., a macro network wireless protocol) such as CDMA (e.g., 1xRTT, 1xEV-DO), iDEN, WiMAX (e.g., IEEE 802.16), LTE, TDMA, AMPS, GSM, GPRS, UMTS, or EDGE, and the communications between the querying mobile station and the nearby mobile stations may occur through a short-range wireless protocol (i.e., a private network wireless protocol) such as Wi-Fi (e.g., IEEE 802.11) or BLUETOOTH. Other protocols, now known or later developed, could be used instead; further, communications with the RAN could instead occur via a short-range protocol, and communications between the mobile stations could instead occur via a wide area network protocol.

These as well as other aspects and advantages will become apparent to those of ordinary skill in the art by reading the following detailed description, with reference where appropriate to the accompanying drawings.

DETAILED DESCRIPTION

Referring to the drawings, as noted above, FIG. 1 is a line drawing depicting a scenario in which an end-user mobile station determines its own location based on locations of nearby end-user mobile stations. The figure depicts four end-user mobile stations 12, 14, 16, 18 each carried by a respective user. These mobile stations may be cellular telephones, personal digital assistants, portable notebook computers, or other types of mobile communication devices. As shown, mobile station 12 is currently located inside a building 20, whereas the other mobile stations are located outside of the building. In this arrangement, mobile stations 14, 16, 18 each have a clear enough view of the sky to receive signals 22, 24, 26 from GPS satellites (an example 28 of which is illustrated) and to thereby determine or facilitate determine of their locations ("GPS locations"). But mobile station 12 is unable to receive GPS signals as the building obstructs its view of the sky, and so mobile station 12 cannot determine its own GPS location.

With this arrangement, mobile station 12 may advantageously use the locations of nearby mobile stations 14, 16, 18 to determine its own location. To do so in accordance with the present method, mobile station 12 may broadcast a short-range wireless query generally seeking the locations of nearby mobile stations. As mobile stations 14, 16, 18 are positioned just outside the building, they may receive the short-range wireless query broadcast from mobile station 12. In response to the query, they may then each send to mobile station 12 (or for that matter simply broadcast, for receipt by mobile station 12) a specification of their GPS location or a specification of their location as determined in some other manner, preferably as geographic coordinates such as latitude and longitude, and possibly altitude, coordinates. This back and forth communication between mobile station 12 and each nearby mobile station 14, 16, 18 is represented in FIG. 1 by arrows 30, 32, 34 and may occur through a short-range wireless communication protocol, such as ad hoc 802.11 signaling for instance, or any other mechanism now known or later developed.

In addition to receiving location coordinates of the nearby mobile stations, mobile station 12 will preferably determine how far away each nearby mobile station is. To facilitate this, each nearby mobile station may include in its response to mobile station a send-timestamp indicating when the nearby mobile station transmitted its location. Mobile station 12 may then read that send-timestamp upon receipt of the response and compare the send time to the current time so as to determine an end-to-end delay for wireless transmission from the nearby mobile station to itself. Based on that delay, the mobile station may then compute its distance from the nearby mobile station. Alternatively, mobile station 12 may determine the distance of each responding mobile station in some other way, such as by pinging each responding mobile station for delay information, and/or by considering signal strength, for instance.

Provided with the location and distance of each nearby mobile station 14, 16, 18, mobile station 12 may then compute (approximate) its own location, through use of a basic triangulation process or any other appropriate algorithm. For instance, mobile station 12 may compute for each nearby mobile station a circle or arc centered around the nearby mobile station and having a radius equal to the determined distance of that nearby mobile station, and mobile station 12 may then take the intersection of those circles or arcs as a representation of its own location. (If altitudes are provided, this analysis can take three dimensions into account).

Figure 1:
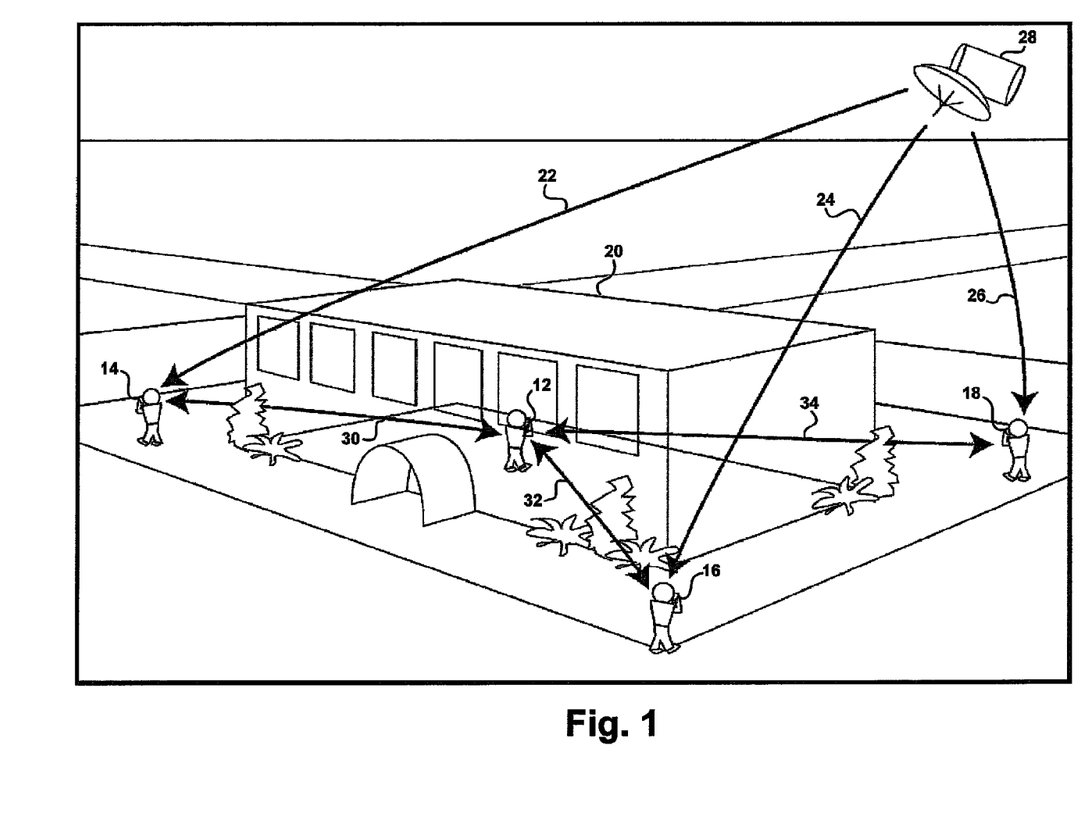
FIG. 1 is a line drawing depicting a scenario in which an end-user mobile station determines its own location based on locations of nearby end-user mobile stations.

Note that the process illustrated by FIG. 1 could apply just as well in other scenarios. For instance, it is not necessary that mobile station 12 lack a plain view of the sky. It may be the case that mobile station 12 is simply not equipped with a GPS receiver or for some other reason seeks to determine its location based on locations of nearby mobile stations, regardless of its capabilities. Further, although just three nearby mobile stations 14, 16, 18 are shown, it is also possible that some other number of mobile stations could provide their location information. If mobile station 12 receives location information from fewer nearby mobile stations, the determination its location may be less accurate. Whereas, if mobile station 12 receives location information from a greater number of nearby mobile stations, the determination of its location may be more accurate.

Figure 2:
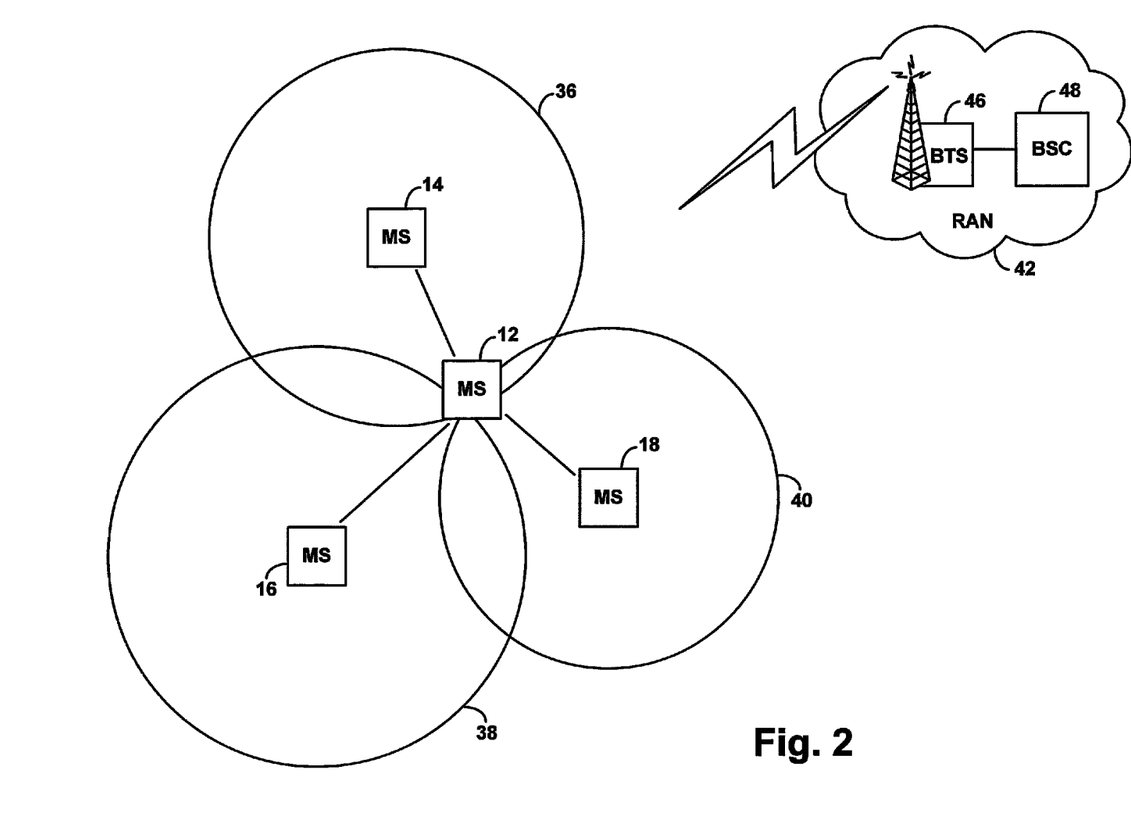
FIG. 2 is a simplified block diagram depicting an arrangement where a mobile station determines its own location based on locations of nearby mobile stations.

FIG. 2 is next a simplified block diagram depicting an arrangement of the four mobile stations of FIG. 1, to help explain the location determination process. The figure depicts for each nearby mobile station a circle 36, 38, 40 centered about the location of the nearby mobile station and having a radius equal to the distance between the nearby mobile station. In practice, mobile station 12 may programmatically compute or represent these circles in memory, and mobile station 12 may programmatically find the point or area of intersection of the circles as a representation of where mobile station 12 is located. Program logic to find the intersection of a group of circles in a plane is known and is therefore not described here. (Likewise, in the event this occurs in three dimensions, program logic to find the intersection of a group of spheres is known and is therefore not described here.)

Additionally shown in FIG. 2 is a cellular radio access network (RAN) 42 that serves mobile stations 12, 14, 16, 18. The RAN may be operated by a wireless carrier to which each mobile station subscribes for service (or with which each mobile station can otherwise engage in useful wireless communication, even if pursuant an inter-carrier roaming agreement), for instance. RAN 42 may operate in a well known manner to provide one or more wireless coverage areas (e.g., cells and cell sectors) 44 in which the illustrated mobile stations can operate and, preferably, to provide the mobile stations with connectivity to one or more transport networks (not shown) such as the public switched telephone network (PSTN) and the Internet. As such, the RAN may take various forms.

By way of example, the RAN is shown including a cellular base transceiver station (BTS) 46 and a base station controller (BSC) 48. These components can be integrated together, however, and the RAN can also include different, fewer, or additional components, depending for instance on the network protocol implemented by the RAN.

Most cellular wireless communication systems provide some channel definitions or other mechanism for a served mobile station to send communications to the RAN and for the RAN to send communications to served mobile stations. For instance, in a system operating according to the well known CDMA air interface protocol, radio frequency (RF) communications from the RAN in a given coverage area are divided into various "forward link" channels on which the RAN can broadcast or unicast information to mobile stations in the coverage area. Further, RF communications in the other direction are divided into various "reverse link" channels on which mobile stations can send information to the RAN. These channels (or any other channels) can be used in the present method to provide the additional enhancement noted above, namely, to trigger transmission of a trust-signal from the RAN to the nearby mobile stations 14, 16, 18.

Figure 3:
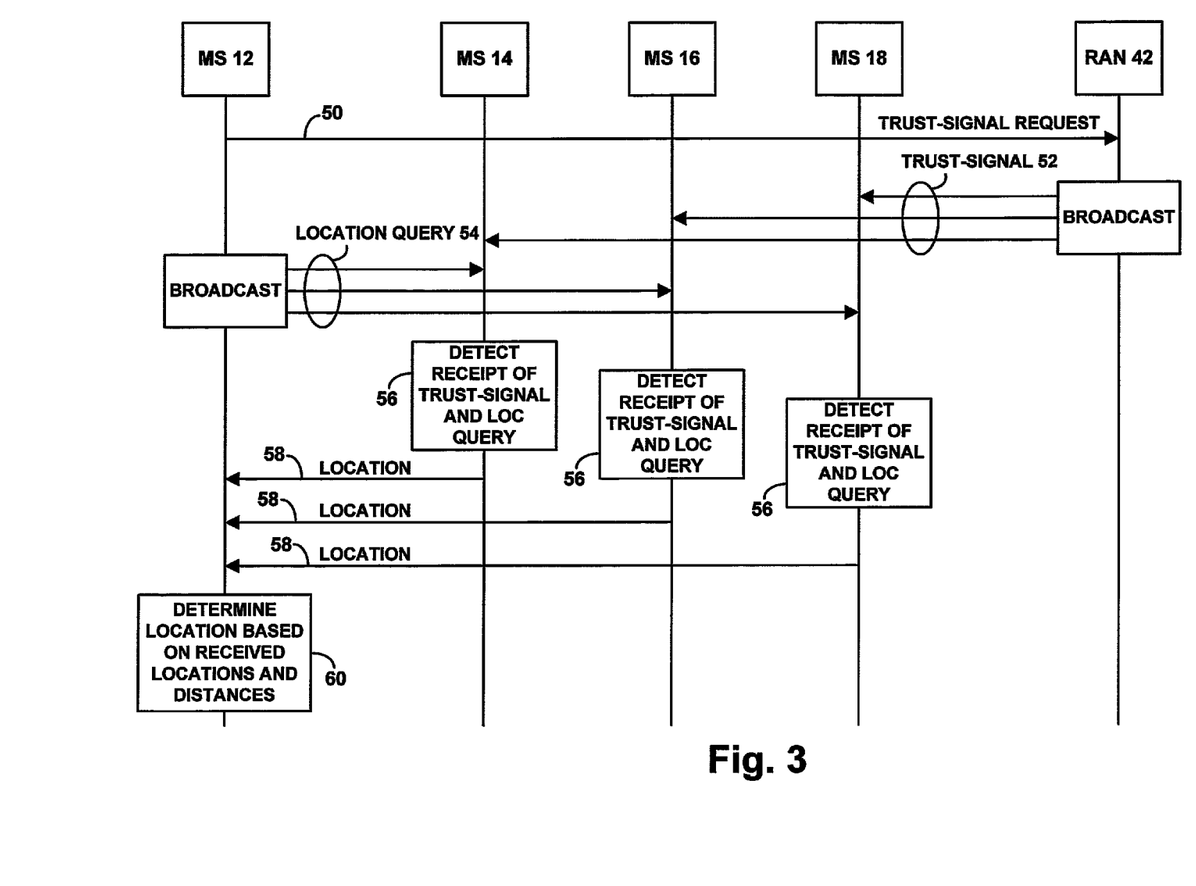
FIG. 3 is a message flow diagram depicting example message flow in accordance with the method.

FIG. 3 is a message flow diagram depicting how this enhanced process can work in practice. The message flow of FIG. 3 assumes that mobile station 12 has encountered a trigger event of some sort that cause mobile station 12 to initiate this process. For example, a user of mobile station 12 may engage a program link or browser link on mobile station 12 that ultimately causes mobile station 12 to determine its own location, and mobile station 12 may then detect that it does not have a GPS signal and therefore seek to determine its own location through the present process instead. Alternatively, the mobile station may have received a request from some other network entity, such as a location-based service provider or other mobile station, to determine location. Other examples of triggers are possible as well.

As shown in FIG. 3, at step 50, mobile station 12 may begin the process by sending to RAN 42 a request for RAN 42 to emit a trust-signal. Mobile station 12 may provide this request to RAN 42 in any of a variety of ways. By way of example, mobile station 12 may provide the request to RAN 42 in the form of an origination message via an access channel, in much the same way that the mobile station may originate a phone call if the mobile station is so equipped. The origination message in this instance, however, can be specially coded to indicate that it is a request for a trust-signal. For instance, the origination message can carry a service option code that the RAN is arranged to treat as an indication that the message is a request for a trust-signal, as opposed to a service option code that the RAN would interpret as a request to initiate a phone call.

In practice, mobile station 12 may include in its trust-signal request an identifier of itself, such as mobile identification number, network access identifier, MAC address, or the like, sufficient for the RAN to determine what mobile station is placing the request and for the RAN to authenticate the requesting device as a condition to responding. Further, mobile station 12 may include in the request a unique key that can be used subsequently in the process to enable mobile station 12 to communicate with the nearby mobile stations 14, 16, 18. The unique key can be a randomly generated binary sequence or other value, preferably one generated dynamically for this location determination process.

Upon receipt of the trust-signal request from mobile station 12, the RAN may authenticate mobile station 12 through any known authentication process and may determine by reference to a subscription record for mobile station 12 whether mobile station 12 is entitled to have the RAN provide a trust-signal as requested. This may be a special service offered by the wireless carrier, for a fee charged to the owner of the mobile station.

Once the RAN decides to provide the requested trust-signal, the RAN then provides the trust-signal as shown at step 52. To focus this process, the RAN preferably provides the trust-signal for receipt by mobile stations that are likely to be nearby the requesting mobile station. To do so in practice, the RAN may simply broadcast the trust-signal on an overhead channel for receipt by mobile stations that are operating in the same wireless coverage area (e.g., cell sector) as the requesting mobile station, and perhaps in adjacent cell sectors. One way to do this may be for the RAN to include the trust-signal within a system parameter message or other control channel message that mobile stations in the coverage area would normally receive and read.

For clarity, FIG. 3 shows step 52 as involving transmission of three signals, one to each of the nearby mobile stations 14, 16, 18. If RAN 42 broadcasts or multicasts the trust-signal for receipt by those nearby mobile stations, merely one instance of the signal could be transmitted, and all three nearby mobile stations may receive that transmission. Thus, the figure indicates that the group of transmissions may cooperatively constitute the trust-signal provided by the RAN.

Alternatively, there may be a way for the RAN to programmatically select which nearby mobile stations (e.g., of those in the same or adjacent coverage area as mobile station 12) should receive the trust-signal, and the RAN may unicast the trust-signal to just those nearby mobile stations. For instance, the RAN may monitor communications by mobile stations, to determine which mobile stations have been engaging in communication with a location server in the wireless carrier's network and which mobile stations have been using GPS functions to determine their GPS locations. The RAN may then target the trust-signal to those mobile stations specifically, particularly because those mobile stations are more likely to already have an indication of their current GPS locations and can therefore more readily respond to a query from mobile station 12.

The trust-signal that the RAN broadcasts preferably includes some sort of code that the recipient mobile stations are arranged to treat as an indication that the signal is a trust-signal. For instance, the code may be a specially defined binary sequence. Further, the trust-signal may include the unique key that was provided by the requesting mobile station, so as to uniquely associate the trust-signal with the requesting mobile station's location determination process. Alternatively, if the requesting mobile station did not provide a unique key, the RAN may itself generate a unique key and provide it in the trust-signal and also provide it in a response signal to the requesting mobile station (or the requesting mobile station can simply receive it by itself also receiving the trust-signal). Alternatively, it is possible that no key will be used, or that some other security and association measure could be implemented.

Transmission of the trust-signal from the RAN to each of the nearby mobile stations can serve at least three beneficial purposes. First, the signal can function to notify each nearby mobile station that the RAN backs the exchange of location information between the nearby mobile station and the querying mobile station 12. Second, the signal can function as a trigger to cause the nearby mobile stations to begin scanning the short-range wireless airwaves (e.g., WiFi or Bluetooth) for a location query signal from mobile station 12; this can be a great benefit, as it may help conserve the battery power of the nearby mobile stations, by avoiding the need for them to monitor the short-range wireless airwaves until necessary. Third, the unique key provided by the trust-signal can be used to facilitate direct (e.g., short-range) wireless communication between the querying mobile station and each nearby mobile station (i.e., direct peer-to-peer communication between the mobile stations, without the communication passing through the RAN on its way from one mobile station to another). For instance, the key could be used as a mutual pairing code to facilitate BLUETOOTH communication between the mobile stations. Or the key could be used in some other manner to mutually secure (e.g., encrypt) communications between the mobile stations. Other benefits may inure as well.

At step 54 in FIG. 3, perhaps after receiving an acknowledgement from the RAN (e.g., separately or as the trust-signal from the RAN), or earlier for that matter, mobile station 12 begins broadcasting a query to seek locations of nearby mobile stations. Preferably, the mobile station will broadcast this query via a short-range wireless protocol, such as Wi-Fi or BLUETOOTH for instance, in much the same way that it is known today for mobile devices to broadcast data such as SSIDs or pairing keys. In a specific embodiment, the query broadcast by the mobile station 12 may specify its identifier and the unique key, with the unique key being couched as a pairing key or otherwise serving to associate requests and responses for the location determination process at issue, and mobile station 12 may then await receipt of pairing responses from other mobile stations. Further, the query may include a defined code that each recipient mobile station is arranged to treat as an indication that the query seeks an indication of the recipient's location.

As with step 52, FIG. 3 shows step 54 as involving transmission of three signals, one to each of the nearby mobile stations 14, 16, 18. There may in fact be a way for mobile station 12 to unicast such query signals to the nearby mobile stations. However, in preferred implementation, mobile station 12 will broadcast a single query signal, and each nearby mobile station that is suitably equipped and is currently scanning the short-range wireless airwaves in search of such a query signal will receive the query signal. Further, to help ensure that this happens, mobile station 12 may repeatedly broadcast the query signal.

As noted above, each nearby mobile station may condition reporting of its location to mobile station 12 on the nearby mobile station having received both (i) the location query from mobile station 12 and (ii) the trust-signal from RAN 42. Thus, at step 56, each nearby mobile station will determine that it has received both the location query from the mobile station 12 and the trust-signal from RAN 42. The nearby mobile station may associate these two received signals with each other if they both contain or reference some common data, such as the unique key, an identifier of mobile station 12, or the like, or may associate the two received signals together in some other manner. Of course, in another embodiment of the process, mobile station 12 may obtain locations of nearby mobile stations without the need for involvement of RAN 42 and/or without the need for a trust-signal.

Continuing with the example, once each nearby mobile station determines that it has received both the location query from mobile station 12 and the trust-signal from RAN 42, the nearby mobile station will send its location to mobile station 12, as shown at step 58. This step assumes, of course, that the nearby mobile station itself is aware of its own location, or determines its location in some manner perhaps in response to the location query.

The nearby mobile station may determine its own location with use of GPS signaling in various other ways to the extent possible. Using GPS signaling, for instance, the nearby mobile station may work with RAN 42 to facilitate an assisted-GPS location determination. Through that process, the nearby mobile station may collect signal delay measurements from three serving cellular base stations in the vicinity and may report the base station identifiers and delay measurements via RAN 42 to a location server (not shown). The location server may then perform a database lookup to determine the fixed locations of the three base stations and may convert the delay measurements into distances respectively between the nearby mobile station and each base station. The location server may then apply triangulation as described above to approximate the nearby mobile station's location.

In turn, the location server may perform a database lookup to determine GPS satellites that should be in the sky over the approximated location of the nearby mobile station, and the location server may then send a signal to the nearby mobile station directing the nearby mobile station to tune to transmissions from those GPS satellites. The nearby mobile station may then report to the location server information about the GPS satellite signals that it then receives, such as delay information, which the location server may in turn use as a basis to more accurately triangulate the location of the nearby mobile station. The location server may then report that determined location to the nearby mobile station. (In an alternative process, some of the steps just described as being carried out by the location server could be carried out instead by the nearby mobile station itself).

Another way for the nearby mobile station to determine its location is for the nearby mobile station to carry out the present method, just as mobile station 12 does, based on locations of nearby mobile stations. This iterative process will be described below.

Regardless of how the nearby mobile station determines or comes to know its own location, however, the nearby mobile conveys its location to mobile station 12 in response to the query from mobile station 12 as shown in FIG. 3. The manner in which each nearby mobile station conveys its location to mobile station 12 may vary depending on the short-range wireless protocol used. Details of certain short-range wireless protocols are known and therefore not described here. Further, others are bound to be developed in the future and can be used as well.

Preferably, each nearby mobile station will include in its response to mobile station 12 at least a specification of the nearby mobile station's location (likely approximated), such as geographic coordinates. Further, the nearby mobile station may include a send timestamp as indicated above, to enable mobile station 12 to determine the transmission delay from the nearby mobile station and to thereby approximate the distance from the nearby mobile station, so as to facilitate triangulation.

In addition, the nearby mobile station may include in its response a level of accuracy of the indicated location of the nearby mobile station. The indication of level of accuracy may be a simple value, such as weighting factor, that the querying mobile station is arranged to interpret as an indication of the accuracy level of the nearby mobile station's provided location. If the nearby mobile station has determined its location with assisted GPS, the accuracy may be relatively high, and so the level of accuracy indicated in the response may be a value that designates high accuracy. On the other hand, if the nearby mobile station has determined its location with mere base station triangulation, the accuracy may be relative low, and so the level of accuracy indicated in the response may be a value that designates low accuracy. Various other examples are possible as well.

Mobile station 12 may use these indicated levels of accuracy in various ways. By way of example, mobile station 12 may determine from the levels of accuracy how many nearby mobile station locations the mobile station should use as a basis to determine its own location. If the indicated levels of accuracy are relatively high, then mobile station may decide that locations of three nearby mobile stations would suffice. Whereas, if the levels of accuracy are relatively low, then the mobile station may decide that locations of a greater number of nearby mobile stations should be factored into its location determination process.

Once mobile station 12 has thereby received a sufficient number of reports of location of nearby mobile stations and has determined the distances for each nearby mobile station, mobile station 12 may then apply triangulation or another suitable process to determine its own location, at step 60. This process is illustrated further back in FIG. 2.

As shown in FIG. 2, mobile station 12 programmatically defines for each nearby mobile station a circle centered about the provided location of the nearby mobile station and having a radius equal to the distance of the nearby mobile station. In particular, mobile station 12 defines a circle 36 centered about the location of mobile station 14 and having a radius equal to the distance that mobile station 12 computed between it and mobile station 14. Likewise, mobile station defines a circle 38 centered about the location of mobile station 16 and having a radius equal to the distance that mobile station 12 computed between it and mobile station 16. And mobile station defines a circle 40 centered about the location of mobile station 14 and having a radius equal to the distance that mobile station 12 computed between it and mobile station 14. Mobile station then programmatically finds the point or area of intersection of those circles, and mobile station assigns that point of intersection (or a representative point in the determined area of intersection) as a representation of the location of mobile station 12.

As noted above, another way for a nearby mobile station to determine its location that it will provide in turn to mobile station 12 is for the nearby mobile station to carry out the present method, just as mobile station 12 does, based on locations of nearby mobile stations.

Figure 4:
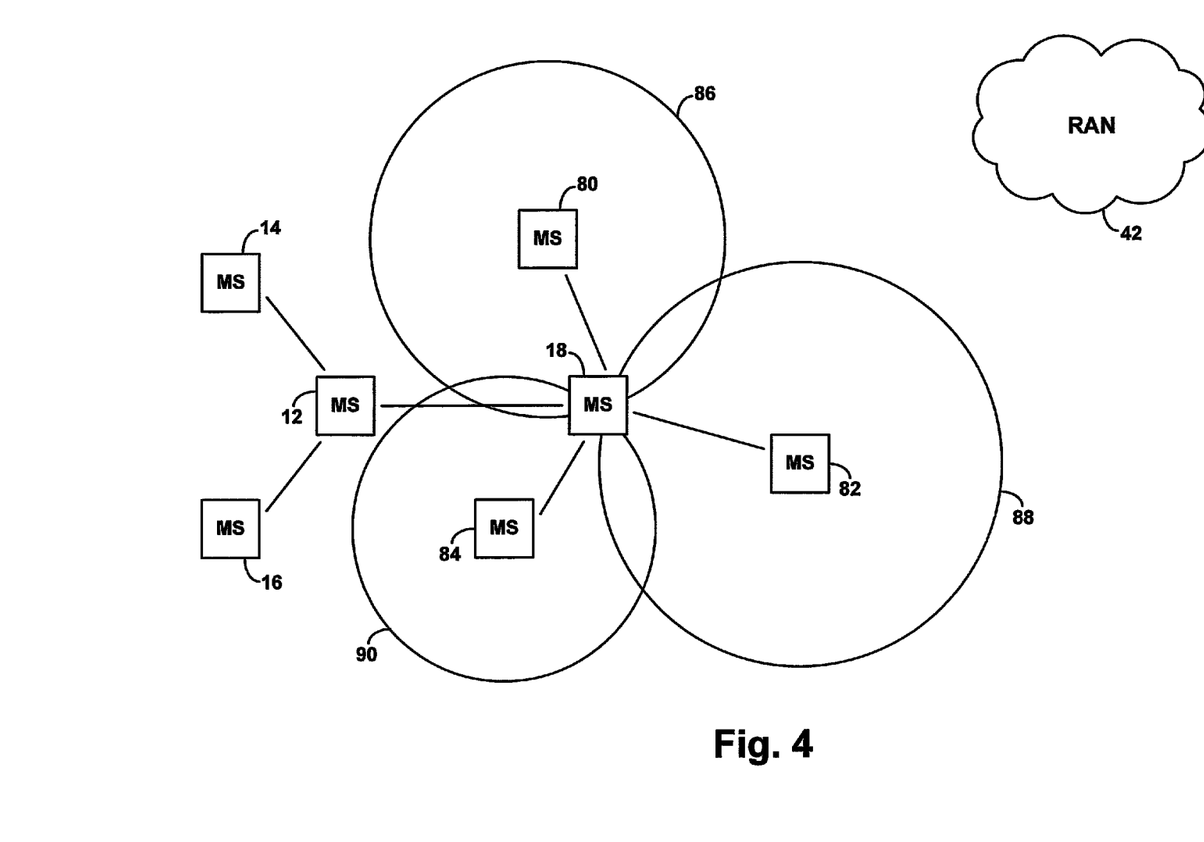
FIG. 4 is a simplified block diagram depicting the arrangement of FIG. 2, where the location of at least one of the nearby mobile stations is likewise determined based on locations of nearby mobile stations.

This iterative process is generally illustrated in part by FIG. 4, in a scenario where mobile station 18 applies the present method to determine its own location based on locations of nearby mobile stations 80, 82, 84. (In practice, mobile station 18 could determine its own location based on locations of mobile stations including, for instance, mobile stations 14 and 16 if possible; for clarity, however, mobile station 18 is shown using locations of other nearby mobile stations as a basis to determine its location.)

In the arrangement of FIG. 4, mobile station 18 may learn the locations and distance of nearby mobile stations 80, 82, 84 according to the present method. For instance, mobile station 18 may broadcast a location query via a short-range wireless protocol, and nearby mobile stations 80, 82, 84 may respond with indications of their locations. Further, mobile station 18 may request RAN 42 to provide a trust-signal, and nearby mobile stations 80, 82, 84 may condition reporting of their locations to mobile station 18 on receipt of both the query from mobile station 18 and the trust-signal from RAN 42. Mobile station 18 may then also determine distances for each of the nearby mobile stations 80, 82, 84. And mobile station may then define circles 86, 88, 90 respectively centered about each nearby mobile station and having radii equal to the determined distances. Mobile station 18 may then find the intersection of those circles and treat that intersection as a representation of its own location, which mobile station 18 may report to mobile station 12 in the process described above.

In this iterative process as well, mobile station 18 may receive indications of level of accuracy from the various nearby mobile stations 80, 82, 84. Mobile station 18 may then use those levels of accuracy in the ways indicated above but may further use the levels of accuracy cooperatively to define a level of accuracy of the location of mobile station 18 that mobile station 18 determines through this process. For instance, if mobile station 18 receives only three relatively-low accuracy locations from nearby mobile stations 80, 82, 84, then mobile station 18 may designate the determined location of mobile station 18 as a low-accuracy location. When mobile station 18 reports that location to mobile station 12 in the process above, mobile station 18 may then include in the report an indication that the location is low-accuracy, to help facilitate the process as described above.

Figure 5:
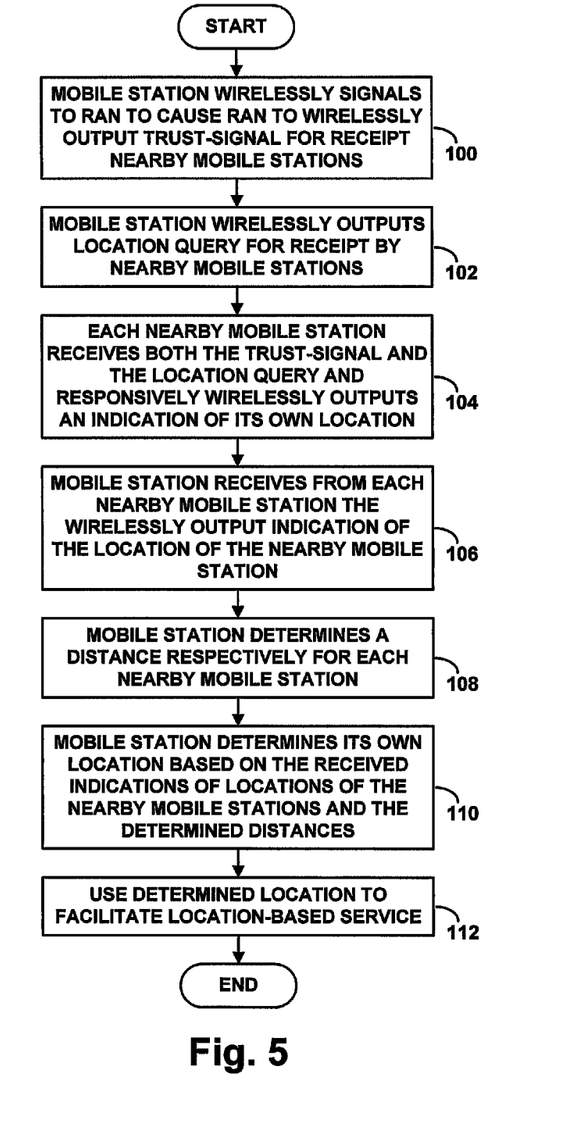
FIG. 5 is a flow chart depicting example functions that can be carried out in accordance with the method.

Turning next to FIG. 5, a flow chart is provided to further illustrate some of the functions that can be carried out in accordance with an example of the present method, to determine the location of a given mobile station, such as mobile station 12, based on the locations of nearby mobile stations, such as mobile stations 14, 16, 18.

As shown in FIG. 5, at block 100, mobile station 12 wirelessly signals to RAN 42 to cause RAN 42 to wirelessly output a trust-signal for receipt by the nearby mobile stations. (As noted above, this trust-signal may cause the nearby mobile stations to turn on their short-range radios so as to begin scanning for a location query.) Further, at block 102, the mobile station wirelessly outputs a location query for receipt by the nearby mobile stations. At block 104, each nearby mobile station receives both the trust-signal from the RAN and the location query from the given mobile station and, responsive to receiving both the trust-signal and the location query, wirelessly outputs an indication of its own location.

At block 106, mobile station 12 receives from each nearby mobile station the wirelessly output indication of the location of the nearby mobile station. Further, at step 108, mobile station 12 determines, respectively for each nearby mobile station, a distance between the given mobile station and the nearby mobile station. At step 110, mobile station then determines its own location based on the received indications of locations of the nearby mobile stations and the determined distances between the given mobile station and each nearby mobile station. Alternatively, rather than mobile station 12 itself making this final determination, mobile station 12 may send the received indications of locations and determined distances to another entity, such as a server via RAN 42, and that entity may determine the location of mobile station 12 based on that data. In any event, the determined location may then be used to facilitate a location-based service, such as emergency response or a commercial service for instance, at step 112.

Figure 6:
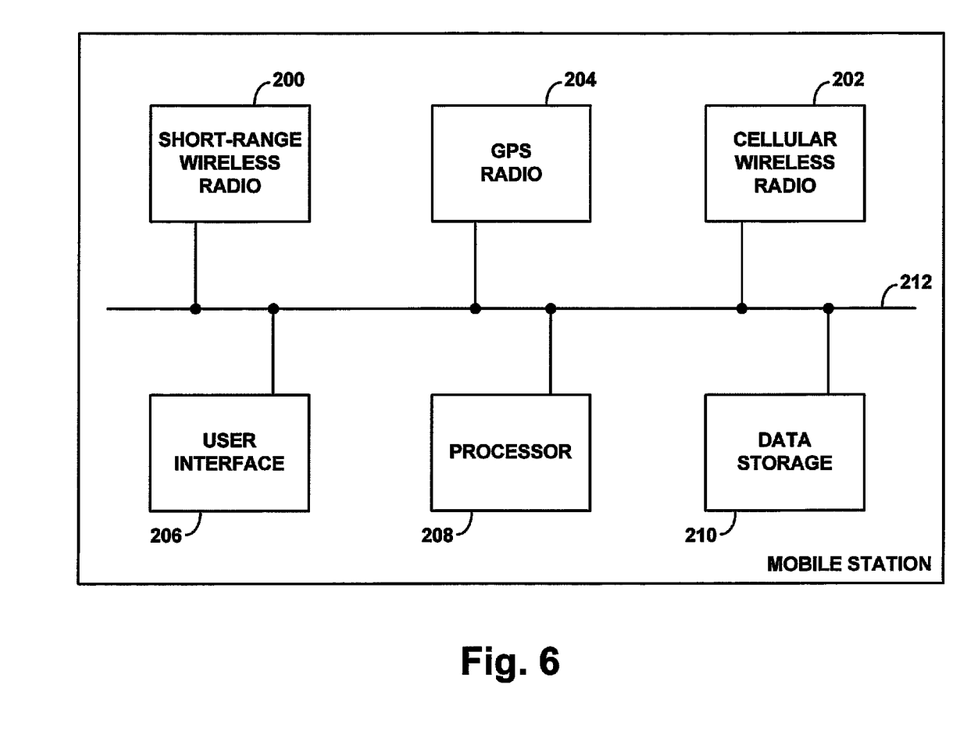
FIG. 6 is a simplified block diagram depicting functional components of a mobile station operable in the method.

FIG. 6 is next a simplified block diagram showing functional components of a mobile station operable in accordance with an example of the present method. As illustrated, the mobile station may include a short-range wireless radio 200, a cellular wireless radio 202, a GPS radio 204, a user interface 206, a processor 208, and data storage 210, all of which may be communicatively linked together by a system bus, network, or other connection mechanism 212.

Short-range wireless radio 200 may comprise a transceiver suitable for allowing the mobile station to engage in wireless communication with other mobile stations according to a short-range wireless protocol, such as BLUETOOTH, Wi-Fi, or another such protocol now known or later developed. As such, the short-range wireless radio 200 may comprise a suitable chipset and antenna, examples of which are well known.

Likewise, cellular wireless radio 202 may comprise a transceiver suitable for allowing the mobile station to engage in cellular wireless communication with RAN 42 according to a cellular wireless protocol such as one of those noted above for instance, or others later developed. As such, cellular wireless radio 202 may similarly comprise a suitable chipset and antenna, examples of which are also well known. Cellular wireless radio 202 may be integrated together with short-range wireless radio 200, such as on a common chipset and possibly sharing a common antenna arrangement.

GPS radio 204, in turn, may comprise a GPS chipset and antenna suitable for allowing the mobile station to tune to various GPS satellites and to receive signals from the satellites, so as to facilitate GPS location determination as described above for instance. In addition, GPS radio 204 may also be integrated with short-range wireless radio 200 and/or with cellular wireless radio 202, such as on a common chipset and sharing a common antenna arrangement for example.

User interface 206 may comprise input and output components to facilitate user interaction with the WCD. For instance, user interface 206 may comprise a keypad, touch-sensitive screen, microphone, camera, and/or other input components, and a display screen, loudspeaker, and/or other output components. Note that, in some implementations, the mobile station might not include any user interface. This may be the case, for instance, if the mobile station comprises a data card (such as a PCMCIA card, an ES card, or a USB card) that couples with a device such as a notebook computer or the like.

Processor 208 may comprise one or more general purposes processors (e.g., INTEL microprocessors) and/or one or more special-purpose processors (e.g., digital signal processors or application specific integrated circuits) and may be integrated with any of the wireless radios noted above. Further, data storage 210 may comprise one or more volatile and/or non-volatile storage components, such as magnetic, optical, or organic storage components, and may be integrated with processor 208.

Data storage 210 preferably contains program instructions executable by processor 208 to carry out various mobile station functions described herein, although such functions can be implemented more generally by hardware, firmware, and/or software.

By way of example, the mobile station may function to detect a trigger for determining its own location and, perhaps after determining that it is unable to receive GPS signals, to initiate the present process of determining its location based on locations of nearby mobile stations. As such, the mobile station may function to send a trust-signal request via cellular wireless radio 202 to RAN 42 to cause RAN 42 to emit a trust-signal, and the mobile station may function to broadcast a location query via short-range wireless radio 200 to seek location information from nearby mobile stations. In turn, the mobile station may function to determine its own location based upon locations and distances of nearby mobile stations.

In addition, if and when the mobile station itself serves as one of the nearby mobile stations (to assist a querying mobile station in determining location per the present process), the mobile station may function to determine and report its own location. For instance, the mobile station may function to determine its own location as a GPS location if possible, or the mobile station may function to determine its own location through the present process, based on locations of other nearby mobile stations. Further, the mobile station may condition such reporting on its receipt of a location query and a trust-signal, and may include a send-timestamp in its report so as to enable the querying mobile station to determine distance and thus to determine location through triangulation or another algorithm.

Figure 7:
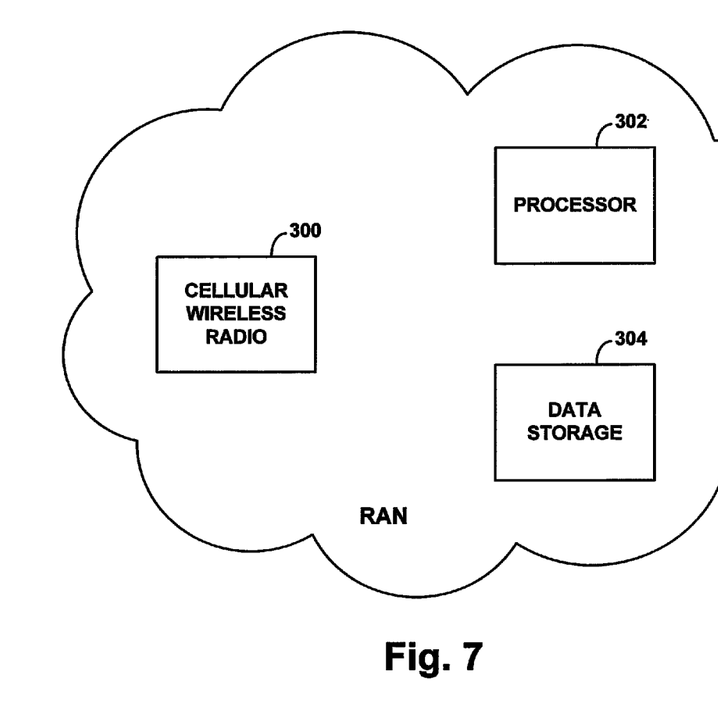
FIG. 7 is a simplified block diagram depicting functional components of a RAN operable in the method.

FIG. 7 is next a simplified block diagram showing functional components of a RAN operable in accordance with an example of the present method. As illustrated, the RAN includes a cellular wireless radio 300, a processor 302, and data storage 304, which may be provided as features of one or more RAN elements such as BTS 46 or BSC 48 for instance, or may be provided in some entity or other manner.

Cellular wireless radio 300 may comprise a transceiver suitable for communicating with and serving various mobile stations according to a cellular wireless protocol such as one of those noted above for instance, or others later developed. As such, cellular wireless radio 300 may comprise a suitable chipset and antenna arrangement (e.g., on an antenna tower), examples of which are well known.

Processor 302 may comprise a one or more general purposes processors and/or one or more special-purpose processors and may be integrated with cellular wireless radio 300. And data storage 304 may comprise one or more volatile and/or non-volatile storage components, such as magnetic, optical, or organic storage components, and may be integrated with processor 302.

Data storage 304 preferably contains program instructions executable by processor 302 to carry out various RAN functions described herein, although such functions can be implemented more generally by hardware, firmware, and/or software.

By way of example, the RAN may function to receive via cellular wireless radio 300 a trust-signal request from a mobile station, to authenticate the mobile station, and to responsively broadcast a trust-signal via cellular wireless radio 300 for receipt by mobile stations nearby the requesting mobile station (such as those in the same coverage area or an adjacent coverage area). Further, the RAN may provide the mobile stations with other service, such as connectivity with one or more transport networks and the ability to communicate with a location server or the like as discussed above.

An exemplary embodiment has been described above. Those of ordinary skill in the art will appreciate, however, that numerous changes to the embodiment described can be made without deviating from the basic principles of the invention.

The invention claimed is:

1. A method for a given cellular telephone to determine its own location, the method comprising:

wirelessly transmitting via at least one wireless transceiver of the given cellular telephone a location query for receipt by each of a plurality of nearby cellular telephones, wherein the given cellular telephone is served by a radio access network (RAN) and wherein the location query passes from the given cellular telephone, respectively, to each nearby cellular telephone without passing through the RAN along the way from the given cellular telephone to the nearby cellular telephone;

wirelessly receiving via the at least one wireless transceiver of the given cellular telephone, respectively from each of the nearby cellular telephones, a report of location of the nearby cellular telephone, wherein the report is provided by the nearby cellular telephone in response to at least the location query from the given cellular telephone;

wirelessly transmitting to the RAN, via the at least one wireless transceiver of the given cellular telephone, a request that includes a key, wherein the request causes the RAN to (a) select the plurality of nearby cellular telephones based on the nearby cellular telephones having been in communication with a location server and (b) provide each of the selected nearby cellular telephones with a trust-signal that includes the key, wherein each of the nearby cellular telephones conditions reporting of its respective location on (i) receiving the location query from the given cellular telephone and (ii) receiving the trust-signal from the RAN;

the given cellular telephone determining a distance, respectively, between the given cellular telephone and each nearby cellular telephone of the plurality; and the given cellular telephone triangulating to determine the location of the given cellular telephone based on the reported locations of the nearby cellular telephones and the determined distances between the given cellular telephone and the nearby cellular telephones.

2. The method of claim 1, further comprising:

encountering at the given cellular telephone a trigger for determining its own location, wherein wirelessly transmitting the location query and wirelessly transmitting the request both occur in response to the encountering of the trigger.

3. The method of claim 1, wherein determining the distance, respectively, between the given cellular telephone and each nearby cellular telephone of the plurality comprises determining the distance based on signal delay between the cellular telephone and the nearby cellular telephone.

4. A method of determining location of a given mobile station based on locations of nearby mobile stations, wherein the given mobile station is served by a radio access network (RAN), the method comprising:

the given mobile station (i) wirelessly signaling to the RAN a request to cause the RAN to (a) select the nearby mobile stations based on the nearby mobile stations having been in communication with a location server and (b) wirelessly output a trust-signal for receipt by the selected nearby mobile stations and (ii) wirelessly outputting a location query for receipt by the nearby mobile stations, wherein each of the nearby mobile stations receives both the trust-signal from the RAN and the location query from the given mobile station and, responsive to and conditional upon receiving both the trust-signal and the location query, wirelessly outputs an indication of its own location, and wherein the request includes a key and the trust-signal includes the key;

receiving into the given mobile station, from each nearby mobile station, the wirelessly-output indication of the location of the nearby mobile station;

determining at the given mobile station, respectively for each nearby mobile station, a distance between the given mobile station and the nearby mobile station; and determining at the given mobile station the location of the given mobile station based on the received indications of locations of the nearby mobile stations and the determined distances between the given mobile station and each nearby mobile station.

5. The method of claim 4, further comprising:

encountering at the given mobile station a trigger for determining location, wherein signaling to the RAN and wirelessly outputting the location query occurs in response to the encountering of the trigger.

6. The method of claim 5, wherein each of the nearby mobile stations further outputs information that allows the given mobile station to determine the distance between the given mobile station and the nearby mobile station, the method further comprising:

receiving into the given mobile station, from each nearby mobile station, the information, wherein determining at the given mobile station, respectively for each nearby mobile station, a distance between the given mobile station and the nearby mobile station comprises the given mobile station using the information received from the nearby mobile station to determine the distance.

7. The method of claim 6, wherein the information comprises a timestamp specifying transmit time from the nearby mobile station, and wherein using the information to determine the distance comprises:

determining a receive time at the given mobile station;

determining a transmission delay between the nearby mobile station and the given mobile station as a difference between the transmit time and the receive time; and translating the determined delay into the distance.

8. The method of claim 5, wherein determining the location of the given mobile station based on the received indications of locations of the nearby mobile stations and the determined distances between the given mobile station and each nearby mobile station comprises:

triangulating to determine the location of the given mobile station based on the received indications of locations of the nearby mobile stations and the determined distances between the given mobile station and each nearby mobile station.

9. The method of claim 5, wherein signaling to the RAN to cause the RAN to wirelessly output a trust-signal for receipt by the nearby mobile stations comprises sending a signal to the RAN via a macro network air interface protocol, and wherein outputting the location query for receipt by the nearby mobile stations comprises broadcasting the location query via a private network air interface protocol with the location query not passing through the RAN on the way from the given mobile station to each nearby mobile station.

10. The method of claim 5, wherein the given mobile station comprises a cellular telephone, and wherein each of the nearby mobile stations comprises a cellular telephone.

11. The method of claim 5, further comprising:
receiving into the given mobile station from each nearby mobile station the key exchanged between the given mobile station and the RAN.

12. The method of claim 11, further comprising:
using the key as a basis to associate communications related to determination of the given mobile station's location.

13. The method of claim 5, wherein each of the nearby mobile stations further outputs an accuracy measure of the location of the nearby mobile station, the method further comprising:
receiving into the given mobile station, from each nearby mobile station, the accuracy measure.

14. The method of claim 4, further comprising:
determining location of at least one of the nearby mobile stations through at least the method of claim 5,
wherein the indication of location of the one nearby mobile station that is output by the one nearby mobile station comprises the determined location of the one nearby mobile station.

15. The method of claim 4, wherein the given mobile station lacks Global Positioning System (GPS) coverage, but each nearby mobile station has GPS coverage, wherein the location of each nearby mobile station is determined based on GPS signals.

16. A mobile wireless communication device (mobile station) comprising:
at least one wireless transceiver;
a processor;
data storage; and
a user interface,
wherein the mobile station is served by a radio access network (RAN), and wherein the mobile station is arranged to determine its own location by carrying out functions comprising:
(a) wirelessly signaling to the RAN a request to cause the RAN to (i) select the nearby mobile stations based on the nearby mobile stations having been in communication with a location server and (ii) wirelessly output a trust-signal for receipt by the selected nearby mobile stations, wherein the request includes a key and the trust-signal includes the key,
(b) wirelessly outputting a location query for receipt by the nearby mobile stations, wherein each of the nearby mobile stations receives both the trust-signal and the location query and, responsive to and conditional upon receiving both the trust-signal and the location query, wirelessly outputs an indication of location of the nearby mobile station,
(c) receiving from each nearby mobile station the wirelessly-output indication of the location of the nearby mobile station,
(d) determining, respectively for each nearby mobile station, a distance between the given mobile station and the nearby mobile station, and
(e) determining the location of the given mobile station based on the received indications of locations of the nearby mobile stations and the determined distances between the given mobile station and each nearby mobile station.

17. The mobile station of claim 16, wherein the at least one wireless transceiver comprises a first wireless transceiver through which the mobile station communicates wirelessly with the RAN, and a second wireless transceiver through which the mobile station communicates wirelessly with each nearby mobile station.

18. The mobile station of claim 16, wherein the given mobile station provides the location query to the nearby mobile stations without the location query passing through the RAN along the way from the given mobile station to each nearby mobile station.

19. The mobile station of claim 16, wherein the mobile station is arranged to automatically start the functions in response to encountering a location-determination trigger.

20. The mobile station of claim 16, wherein determining the distance, respectively, between the mobile station and each nearby mobile station comprises determining the distance based on signal delay between the mobile station and the nearby mobile station.

* * * * *

UNITED STATES PATENT AND TRADEMARK OFFICE
CERTIFICATE OF CORRECTION

PATENT NO.        : 8,417,264 B1
APPLICATION NO.   : 12/465846
DATED             : April 9, 2013
INVENTOR(S)       : Jason K. Whitney et al.

It is certified that error appears in the above-identified patent and that said Letters Patent is hereby corrected as shown below:

On the title page, at Item [73], please delete Assignee "Spring Spectrum L.P." and add Assignee -- Sprint Spectrum L.P. --.

Signed and Sealed this
Twenty-eighth Day of May, 2013

Teresa Stanek Rea
*Acting Director of the United States Patent and Trademark Office*